US006803166B2

(12) United States Patent
Cheng et al.

(10) Patent No.: US 6,803,166 B2
(45) Date of Patent: Oct. 12, 2004

(54) TONER PROCESSES

(75) Inventors: Chieh-Min Cheng, Rochester, NY (US); Emily L. Moore, Mississauga (CA); Amy A. Albright, Rochester, NY (US); Tie Hwee Ng, Mississauga (CA)

(73) Assignee: Xerox Corporation, Stamford, CT (US)

( * ) Notice: Subject to any disclaimer, the term of this patent is extended or adjusted under 35 U.S.C. 154(b) by 93 days.

(21) Appl. No.: 10/368,339

(22) Filed: Feb. 18, 2003

(65) Prior Publication Data

US 2004/0162373 A1 Aug. 19, 2004

(51) Int. Cl.[7] .................................................. G03G 5/00

(52) U.S. Cl. .................................. 430/137.14; 524/392

(58) Field of Search ...................... 430/137.14; 524/392

(56) References Cited

U.S. PATENT DOCUMENTS

| | | | | |
|---|---|---|---|---|
| 4,558,108 | A | 12/1985 | Alexandru et al. | 526/340 |
| 4,797,339 | A | 1/1989 | Maruyama et al. | 430/109 |
| 4,983,488 | A | 1/1991 | Tan et al. | 430/137 |
| 4,996,127 | A | 2/1991 | Hasegawa et al. | 430/109 |
| 5,593,807 | A | 1/1997 | Sacripante et al. | 430/137 |
| 5,604,076 | A | 2/1997 | Patel et al. | 430/137 |
| 5,648,193 | A | 7/1997 | Patel et al. | 430/137 |
| 5,658,704 | A | 8/1997 | Patel et al. | 430/137 |
| 5,660,965 | A | 8/1997 | Mychajlowskij et al. | 430/137 |
| 5,840,462 | A | 11/1998 | Foucher et al. | 430/137 |
| 5,843,614 | A | 12/1998 | Shinzo et al. | 430/137 |
| 5,853,944 | A | 12/1998 | Foucher et al. | 430/137 |
| 5,945,245 | A | 8/1999 | Mychajlowskij et al. | 430/137 |
| 6,132,924 | A | 10/2000 | Patel et al. | 430/137 |
| 6,294,302 | B1 | 9/2001 | Serizawa et al. | 430/106 |
| 6,329,114 | B1 | 12/2001 | Watanabe et al. | 430/110.4 |
| 6,391,510 | B1 | 5/2002 | Ishiyama et al. | 430/111.4 |

*Primary Examiner*—Mark A. Chapman
(74) *Attorney, Agent, or Firm*—E. D. Palazzo

(57) ABSTRACT

A process comprising heating a latex and a colorant, and optionally a wax, and wherein the latex contains a polymer with a $M_z$ value of from about 60,000 to about 150,000.

35 Claims, No Drawings

TONER PROCESSES

PENDING APPLICATIONS AND PATENTS

Illustrated in copending application U.S. Ser. No. 10/261,129, filed Sep. 27, 2002, entitled Toners and Developers, the disclosure of which is totally incorporated herein by reference, is a toner comprising at least one binder in an amount of from about 85 to about 99 percent by weight, at least one colorant in an amount of from about 0.5 to about 15 percent by weight, and calcium stearate in an amount of from about 0.05 to about 2 percent by weight, and wherein following triboelectric contact with carrier particles, the toner has a charge Q measured in femtocoulombs per particle diameter D measured in microns (Q/D) of from about −0.1 to about −1 fC/μm with a variation during development of from about 0 to about 0.25 fC/μm, and wherein the distribution is substantially unimodal and possesses a peak width of from about 0.1 fC/μm to about 0.5 fC/μm and the toner possesses a charge to mass M, as measured in grams, ratio (Q/M) of from about −25 to about −70 μC/gram with variation of Q/M during development of from about 0 to about 15 μC/gram and wherein emulsion aggregation process can be selected for the generation of the aforementioned toners.

In U.S. Pat. No. 6,132,924, the disclosure of which is totally incorporated herein by reference, there is illustrated a process for the preparation of toner comprising mixing a colorant, a latex, and two coagulants, followed by aggregation and coalescence, and wherein one of the coagulants may be polyaluminum chloride.

Illustrated in copending application U.S. Ser. No. 10/086,063, filed Mar. 1, 2002, entitled Toner Processes, the disclosure of which is totally incorporated herein by reference, is a process comprising heating a latex, a colorant dispersion, a polytetrafluoroethylene dispersion, and an organo metallic complexing component.

Illustrated in U.S. Pat. No. 5,945,245, the disclosure of which is totally incorporated herein by reference, is a process for the preparation of toner compositions comprising:

(i) preparing an emulsion latex comprised of sodio sulfonated polyester resin particles of from about 5 to about 500 nanometers in size diameter, by heating said resin in water at a temperature of from about 65° C. to about 90° C.;

(ii) preparing a pigment dispersion in water by dispersing in water from about 10 to about 25 weight percent of sodio sulfonated polyester, and from about 1 to about 5 weight percent of pigment;

(iii) adding the pigment dispersion to a latex mixture comprised of sulfonated polyester resin particles in water with shearing, followed by the addition of an alkali halide in water until aggregation results, as indicated by an increase in the latex viscosity of from about 2 centipoise to about 100 centipoise;

(iv) heating the resulting mixture at a temperature of from about 45° C. to about 55° C., thereby causing further aggregation and enabling coalescence, resulting in toner particles of from about 4 to about 9 microns in volume average diameter and with a geometric distribution of less than about 1.3; and optionally (v) cooling the product mixture to about 25° C. and followed by washing and drying.

The appropriate components and processes of the above patent applications and patents may be selected for the present invention in embodiments thereof.

BACKGROUND

The present invention is directed to a toner process, and more specifically, to chemical toner processes which involve the aggregation and fusion of latex, colorant like pigment or dye, and optional toner additive particles.

In embodiments, the present invention is directed to toner compositions and processes thereof, and wherein a polymer present in the latex possesses a number of molecular weight characteristics, such as $M_z$, $M_n$, and $M_w$ to, for example, thereby control the polymer stringiness, which stringiness can be adversely affected by the viscosity and polymer molecular weight and to permit excellent developed image surface gloss and avoid/minimize undesirable toner offset. More specifically, stringiness refers, for example, to one of the toner properties characteristics with high molecular compounds. As stringiness increases, stripping during oil-less fixing worsens. Stringiness is affected by the polymer molecular weight. When the resin has a high, for example, equal to or in excess of about 35,000 molecular weight, stringiness can be easily controlled within a practical a fixing temperature of, for example, about 130° C. to about 190° C., fixing temperature range, however, the resulting fixed image cannot usually be provided with a desirable, for example, from about 25 to about 65 gloss units surface gloss, especially when an amorphous binder resin is selected. Further, when the binder resin has a low $M_w$of, for example, equal to or lower than about 20,000 the appearance of stringiness can be suppressed, occasionally providing image gloss, however, toner and image offset can result at high temperatures of, for example, about 170° C. As stringiness increases, stripping during oil-less fixing decreases, and thus the stripping force that may be required for stripping of a fused toner image from a fuser roll can be increased. Stringiness can be characterized by the measurement of the stripping force. Stripping force is measured by using a remodeled version of a Color 645 Stripping Force Fixture of fused toner on Fuji Xerox S paper with a controlled toner mass per unit area of 1.35 milligram/$cm^2$ with the fixing rate being predetermined to 200 mm/sec, the carried amount of toner being predetermined to 4.5 $g/m^2$, 9 $g/m^2$ and 13.5 $g/m^2$, and the fixing temperature being predetermined to 160° C., 180° C. and 200° C. The fused toners, fused at, for example, about 160° C., 180° C. and 200° C., respectively, can be peeled from a fuser roll without any substantial resistance regardless of the carried amount of the toner. In general, it is desirable to have a low stripping force, such as for example a stripping force below 25 gram-force, and more specifically, gram-cm/$sec^2$ and preferably below 20 gram-force, to for example, achieve a fixed image with a high surface gloss and no high temperature offset occurring.

The toners generated with the processes of the present invention can be selected for copying and printing processes, including color processes, and for imaging processes, and which toners can provide, for example, high quality colored images with excellent image resolution, acceptable signal-to-noise ratio, substantial insensitivity to relative humidity, certain selected gloss characteristics, minimum toner offsetting from fuser rolls, and image uniformity. Also, the toners obtained with the processes illustrated herein can be selected for digital imaging systems and processes, such as the Xerox Corporation DocuCenter Color 500/550 and similar Xerox Corporation DocuColor products.

REFERENCES

In xerographic systems, especially color systems, small sized toners of, for example, from about 2 to about 8 microns can be important to the achievement of high image quality for process color applications. It is also important to have a low image pile height to eliminate, or minimize image feel and avoid paper curling after fusing. Paper curling can be particularly pronounced in xerographic color processes primarily because of the presence of relatively high toner coverage as a result of the application of three to four color toners. During fusing, moisture escapes from the paper due to high fusing temperatures of from about 120° C. to about 200° C. In the situation wherein only one layer of toner is selected, such as in one-color black or highlight color xerographic applications, the amount of moisture driven off during fusing can be reabsorbed by the paper, and the resulting print remains relatively flat with minimal paper curl. In process color where toner coverage is high, the relatively thick toner plastic covering on the paper can inhibit the paper from reabsorbing the moisture, and cause substantial paper curling. These and other imaging shortfalls and problems are avoided or minimized with the toners and processes of the present invention.

Also, it may be useful to select certain toner particle sizes, such as from about 2 to about 10 microns, with a high colorant, especially pigment loading, such as from about 4 to about 15 percent by weight of toner, so that the mass of toner necessary for attaining the required optical density and color gamut can be significantly reduced to eliminate or minimize paper curl. Lower toner mass also ensures the achievement of image uniformity. However, higher pigment loadings often adversely affect the charging behavior of toners. For example, the charge levels may be too low for proper toner development or the charge distributions may be too wide and toners of wrong charge polarity may be present. Furthermore, higher pigment loadings may also result in the sensitivity of charging behavior to charges in environmental conditions, such as temperature and humidity. Toners prepared in accordance with the processes of the present invention minimize, or avoid these disadvantages.

There is illustrated in U.S. Pat. No. 4,996,127, the disclosure of which is totally incorporated herein by reference, a toner of associated particles of secondary particles comprising primary particles of a polymer having acidic or basic polar groups and a coloring agent. The polymers selected for the toners of the '127 patent can be prepared by an emulsion polymerization method, see for example columns 4 and 5 of this patent. In column 7 of this '127 patent, it is indicated that the toner can be prepared by mixing the required amount of coloring agent and optional charge additive with an emulsion of the polymer having an acidic or basic polar group obtained by emulsion polymerization. In U.S. Pat. No. 4,983,488, the disclosure of which is totally incorporated herein by reference, there is disclosed a process for the preparation of toners by the polymerization of a polymerizable monomer dispersed by emulsification in the presence of a colorant and/or a magnetic powder to prepare a principal resin component, and then effecting coagulation of the resulting polymerization liquid in such a manner that the particles in the liquid after coagulation have diameters suitable for a toner. It is indicated in column 9 of this patent that coagulated particles of 1 to 100, and particularly 3 to 70 microns, are obtained. In U.S. Pat. No. 4,797,339, the disclosure of which is totally incorporated herein by reference, there is disclosed a process for the preparation of toners by resin emulsion polymerization wherein similar to the '127 patent certain polar resins are selected; and in U.S. Pat. No. 4,558,108, the disclosure of which is totally incorporated herein by reference, there is disclosed a process for the preparation of a copolymer of styrene and butadiene by specific suspension polymerization.

Polyester based chemical toners substantially free of encapsulation are also known, reference U.S. Pat. No. 5,593,807, the disclosure of which is totally incorporated herein by reference, wherein there is disclosed a process for the preparation of a toner comprised of a sodio sulfonated polyester resin and pigment, and wherein the aggregation and coalescence of resin particles is mediated with an alkali halide. Other U.S. Patents that may be of interest, the disclosures of which are totally incorporated herein by reference, are U.S. Pat. Nos. 5,853,944; 5,843,614; 5,840,462; 5,604,076; 5,648,193; 5,658,704; and 5,660,965.

Emulsion/aggregation/coalescence processes for the preparation of toners are illustrated in a number of Xerox Corporation patents, the disclosures of each of which are totally incorporated herein by reference, such as U.S. Pat. Nos. 5,290,654, 5,278,020, 5,308,734, 5,370,963, 5,344,738, 5,403,693, 5,418,108, 5,364,729, and 5,346,797; and also of interest may be U.S. Pat. Nos. 5,348,832; 5,405,728; 5,366,841; 5,496,676; 5,527,658; 5,585,215; 5,650,255; 5,650,256; 5,501,935; 5,723,253; 5,744,520; 5,763,133; 5,766,818; 5,747,215; 5,827,633; 5,853,944; 5,804,349; 5,840,462; 5,869,215; 5,863,698; 5,902,710; 5,910,387; 5,916,725; 5,919,595; 5,925,488; 5,858,601, and 5,977,210. The appropriate components and processes of the above Xerox Corporation patents can be selected for the processes of the present invention in embodiments thereof.

Also, reference is made to U.S. Pat. Nos. 6,294,302; 6,391,510 and 6,329,114.

With respect to the prior art, only a part thereof has been selected and this part may or may not be fully representative of the prior art teachings or disclosures.

SUMMARY

It is a feature of the present invention to provide toner processes with many of the advantages illustrated herein.

In another feature of the present invention there are provided simple and economical processes for the preparation of black and colored toner compositions with excellent colorant dispersions thus enabling the achievement of excellent color print quality; and a simple and economical chemical process for the preparation of toner compositions wherein the latex selected possesses a number of molecular weight characteristics.

Additionally, another feature of the present invention resides in a process capable of delivering differing toner morphology particles, such as spherically shaped toner particles and toners that possess minimum or substantially no toner offset, and wherein preselected surface gloss characteristics can be achieved.

Moreover, in another feature of the present invention there are provided emulsion, aggregation, coalescence processes wherein, for example, there is selected a polymer latex with a number of $M_z$, $M_w$, and $M_n$, characteristics.

Aspects of the present invention relate to a process comprising heating a latex and a colorant, and optionally a wax, and wherein the latex contains a polymer with a $M_z$ value of from about 60,000 to about 150,000; a toner process wherein heating involves a first heating below the glass transition temperature of the resin and a second heating above the glass transition temperature of the latex resin; a process wherein the toner resin selected possesses a $M_z$ of from about 65,000 to about 135,000, of from about 75,000 to about 130,000, or from about 80,000 to about 125,000; a toner process comprising mixing a latex with a colorant; heating the resulting mixture below the glass transition temperature (Tg) of the latex resin; heating above the Tg of the latex resin; and wherein the latex contains a polymer with an $M_z$ value of from about 70,000 to about 150,000, and in embodiments certain specific $M_z/M_n$, and $M_z/M_w$ ratios; a process wherein the latex is a latex emulsion comprised of resin, water, and an ionic surfactant, and wherein the colorant mixture is a dispersion containing a colorant, water, and an ionic surfactant, and wherein the latex contains a polymer with an $M_z$, of from about 60,000 to about 150,000, and more specifically, from about 75,000 to about 130,000, and yet more specifically, from about 80,000 to about 125,000; an $M_w$ of from about 25,000 to about 45,000, and more specifically, from about 28,000 to about 40,000, and yet more specifically, from about 28,000 to about 37,000; an $M_n$ of from about 6,000 to about 15,000, and more specifically, from about 8,000 to about 13,000, and yet more specifically, from about 9,000 to about 12,000; and wherein the ratio of $M_z/M_w$, weight average molecular weight, is, for example, from about 2 to about 5, and more specifically, from about 2 to about 4; and the ratio of $M_z/M_n$, number average molecular weight is from about 6 to about 13, and more specifically, from about 8 to about 10; a process wherein there is selected for the ionic surfactant a nonionic surfactant; a process wherein each of the surfactants is selected in an amount of from about 1 to about 10 weight percent based on the toner component amounts; a process wherein there can optionally be added to the mixture a second latex, and which latex is comprised of submicron resin particles suspended in an aqueous phase containing an ionic surfactant, and wherein the second latex is optionally selected in an amount of from about 10 to about 40 percent by weight of the initial latex; a process wherein the temperature about below the latex resin Tg is from about 40° C. to about 60° C., thereby resulting in toner aggregates, and the temperature above about the latex resin Tg is from about 75° C. to about 97°C.; a process wherein the temperature at which the aggregation is accomplished controls the size of the aggregates, and wherein the toner isolated is of from about 2 to about 25 microns in volume average diameter; a process wherein the colorant is a pigment; a process wherein the latex contains a polyester, such as polyester SPE2, available from Hercules Chemical; a toner wherein the latex polymer is present in an amount of from about 65 to about 96 percent by weight of the toner; the colorant is present from an amount of from about 2 to about 15 weight percent of the toner, and the wax is present in an amount of from about 2 to about 20 weight percent of the toner; a toner comprised of latex polymer with certain molecular weight properties; a toner comprised of a colorant and a polyester alkyl carboxylate metal salt of the formula

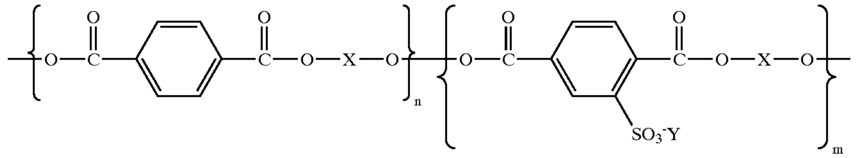

Y is a metal such as sodium, potassium, cesium, rubidium, lithium, beryllium, magnesium, calcium, barium and the like; X is a glycol or is generated from glycol; and m and n represent the number of repeating segments; a process for the preparation of toner comprising mixing a latex with a colorant mixture comprised of colorant, and an ionic surfactant; heating the resulting mixture below about the glass transition temperature (Tg) of the latex resin; heating above about the Tg of the latex resin, and isolating the toner, and wherein the latex contains a polymer with the molecular weight characteristics illustrated herein; a process wherein the latex is a latex emulsion comprised of resin, water, and an ionic surfactant, and wherein the colorant mixture is a dispersion containing a colorant, water, and an ionic surfactant; a process wherein there is selected for the ionic surfactant a nonionic surfactant; a process wherein each of the surfactants is selected in an amount of from about 1 to about 7 weight percent based on the toner component amounts; a process wherein there can optionally be added to the mixture a second latex, and which latex is comprised of submicron, about 0.05 to about 1, resin particles suspended in an aqueous phase containing an ionic surfactant, and wherein the second latex is selected in an amount of from about 10 to about 30 percent by weight of the initial latex; a process wherein the temperature about below the latex resin Tg is from about 45° C. to about 70° C., thereby resulting in toner aggregates, and the temperature above about the latex resin Tg is from about 75° C. to about 95° C.; a process wherein the temperature at which the aggregation is accomplished controls the size of the aggregates, and wherein the toner isolated is from about 2 to about 15 microns in volume average diameter; a process wherein the latex resin is selected from the group consisting of poly (styrene-butadiene), poly(methylstyrene-butadiene), poly (methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), and poly(styrene-butyl acrylate-acrylononitrile-acrylic acid); a process wherein the colorant is carbon black, cyan, yellow, magenta, or mixtures thereof, and the toner isolated is from about 2 to about 25 microns in volume average diameter, and the particle size distribution thereof is optionally from about 1.15 to about 1.30, and wherein there is optionally added to the surface of the formed toner metal salts, metal salts of fatty acids, silicas, metal oxides, or mixtures thereof, each in an amount of from about 0.1 to about 10 weight percent of the obtained toner; a process wherein the colorant is a colorant dispersion comprised of (i) a colorant, water, an ionic surfactant, a nonionic surfactant or mixtures of an ionic surfactant, and a nonionic surfactant; the latex is a latex emulsion; and wherein the (ii) colorant dispersion is blended with the latex emulsion comprised of resin, a nonionic surfactant and an ionic surfactant, and optionally adding a wax dispersion comprised of submicron particles in the diameter size range of from about 0.1 to about 0.4 micron dispersed in an ionic surfactant of the same charge polarity as that of the ionic surfactant in the colorant dispersion or latex emulsion;

(iii) heating the resulting mixture below about, or about equal to the glass transition temperature (Tg) of the latex resin to form toner sized aggregates;

(iv) heating the resulting aggregate suspension above about the Tg of the latex resin; a process for the preparation of toner comprising (i) providing or generating a latex emulsion of resin, water, and an ionic surfactant, and providing or generating a colorant dispersion containing a colorant, water, an ionic surfactant, or a nonionic surfactant;

(ii) optionally providing or generating a wax dispersion containing an anionic surfactant similarly charged to that of the latex surfactant emulsion;

(iii) blending (ii) with the colorant dispersion;

(iv) heating the resulting mixture below the glass transition temperature (Tg) of the latex resin;

(v) heating (vii) above about the Tg of the latex resin;

(vi) mixing;

(vii) retaining the mixture (vi) at a temperature of from about 70° C. to about 95° C. for about 3 to about 10 hours;

(viii) washing the resulting toner slurry; and (ix) isolating the toner; a process wherein the added latex contains the same resin as the initial latex of (i), or wherein the added latex contains a dissimilar resin than that of the initial latex resin (i); a process wherein aggregation of latex resin and colorant is accomplished by heating at a temperature below the glass transition temperature of the resin or polymer contained in the latex, and coalescence is accomplished by heating at a temperature of above the glass transition temperature of the polymer contained in the latex (i) to enable fusion or coalescence of colorant and latex resin; a process wherein the aggregation temperature is from about 40° C. to about 60° C., and the coalescence temperature is from about 75° C. to about 97° C. a process wherein the temperature at which the aggregation is accomplished controls the size of the aggregates, and wherein the toner isolated is from about 2 to about 10 microns in volume average diameter; a process for preparing toner particles comprising (i) providing or generating a latex emulsion of resin with certain molecular weight properties, water, and an anionic surfactant; a process wherein the latex emulsion comprises submicron resin particles in the size range of about 100 to about 500 nanometers, and more specifically, in the size range of about 150 to about 400 nanometers in water, and an ionic surfactant, and more specifically, an anionic surfactant; the colorant dispersion comprises submicron pigment particles of about 50 to about 250 nanometers, and more specifically, of about 80 to about 200 nanometers in size; a toner process wherein the cationic surfactant comprises, for example, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, and which coagulant surfactant component is selected in an amount of, for example, from about 0.01 to about 10 percent by weight of toner; a process wherein there is added during or subsequent to (v) a second latex, and which latex is comprised of submicron resin particles suspended in an aqueous phase containing an ionic surfactant, and wherein the second latex is optionally selected in an amount of about 20 to about 35 percent by weight of the initial latex; a process wherein the second latex (vi) is added and enables formation of a coating on the resulting toner aggregates of (v), and wherein the thickness of the formed coating is from about 0.1 to about 1 micron; a process wherein the aggregation temperature is from about 50° C. to about 60° C. and the coalescence temperature is from about 80° C. to about 95° C. a process wherein the latex (i) or added latex contains a resin selected from the group consisting of a number of suitable known resins, or polymers, and more specifically, poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), and poly(butyl acrylate-isoprene); poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), poly(styrene-butyl acrylate-acrylononitrile-acrylic acid), poly(styrene-butadiene-β-carboxyethyl acrylate), poly(styrene-butadiene-acrylonitrile-β-carboxyethyl acrylate), poly(styrene-butyl acrylate-β-carboxyethyl acrylate), and poly(styrene-butyl acrylate-acrylononitrile-β-carboxyethyl acrylate); a process wherein the toner colorant is carbon black, cyan, yellow, magenta, or mixtures thereof, and the toner isolated is from about 1 to about 25 microns in volume average diameter, nd the particle size distribution thereof is optionally from about 1.15 to about 1.30; and wherein there is added to the surface of the formed toner metal salts, metal salts of fatty acids, silicas, metal oxides, or mixtures thereof, each in an amount of from about 0.1 to about 10 weight percent of the obtained toner.

Examples of polyester resins are as indicated herein and in the appropriate U.S. patents recited, and more specifically, examples of a number of polyesters are the beryllium salt of copoly(1,2-propylene-dipropylene-5-sulfoisophthalate)-copoly(1,2-propylene-dipropylene terephthalate), the barium salt of copoly(1,2-propylene-diethylene-5-sulfoisophthalate)-copoly(1,2-propylene-diethylene terephthalate), the magnesium salt of copoly(1,2dipropylene-5-sulfoisophthalate)-copoly(1,2-propylene terephthalate), the magnesium salt of copoly(1,3-butylene-5-sulfoisophthalate)-copoly(1,3-butylene terephthalate), the calcium salt of copoly(1,2-dipropylene-5-sulfoisophthalate)-copoly(1,2-propylene terephthalate), the calcium salt of copoly(1,3-butylene-5-sulfoisophthalate)-copoly(1,3-butylene terephthalate), the cobalt salt of copoly (1,2-propylene-diethylene-5-sulfoisophthalate)-copoly (1,2-propylene-diethylene terephthalate), the nickel salt of copoly(1,2-dipropylene-5-sulfoisophthalate)-copoly(1,2-propylene terephthalate), the iron salt of copoly(1,3-butylene-5-sulfoisophthalate)-copoly(1,3-butylene terephthalate), the zirconium salt of copoly(1,2-dipropylene-5-sulfoisophthalate)-copoly(1,2-propylene terephthalate), the chromium salt of copoly(1,3-butylene-5-sulfoisophthalate)-copoly(1,3-butylene terephthalate), and the like.

Various known colorants, especially pigments, present in the toner in an effective amount of, for example, from about 1 to about 65, and more specifically, from about 2 to about 35 percent by weight of the toner, and more specifically, in an amount of from about 1 to about 15 weight percent, and wherein the total of all toner components is about 100 percent, include carbon black like REGAL 330®; magnetites such as Mobay magnetites MO8029™, MO8060™; and the like. As colored pigments, there can be selected known cyan, magenta, yellow, red, green, brown, blue or mixtures thereof. Specific examples of colorants, especially pigments, include phthalocyanine HELIOGEN BLUE L6900™, D6840™, D7080™, D7020™, Cyan 15:3, Magenta Red 81:3, Yellow 17, the pigments of U.S. Pat. No. 5,556,727, the disclosure of which is totally incorporated herein by reference, and the like. Examples of specific magentas that may be selected include, for example, 2,9-dimethyl-substituted quinacridone and anthraquinone dye identified in the Color Index as Cl 60710, Cl Dispersed Red 15, diazo dye identified in the Color Index as Cl 26050, Cl Solvent Red 19, and the like. Illustrative examples of specific cyans that may be selected include copper tetra (octadecyl sulfonamido) phthalocyanine, x-copper phthalocyanine pigment listed in the Color Index as Cl 74160, Cl Pigment Blue, and Anthrathrene Blue, identified in the Color Index as Cl 69810, Special Blue X-2137, and the like; while illustrative specific examples of yellows that may be selected are Diarylide Yellow 3,3-dichlorobenzidene acetoacetanilides, a monoazo pigment identified in the Color Index as Cl 12700, Cl Solvent Yellow 16, a nitrophenyl amine sulfonamide identified in the Color Index as Foron Yellow SE/GLN, Cl Dispersed Yellow 33 2,5-dimethoxy-4-sulfonanilide phenylazo4'-chloro-2,5dimethoxy acetoacetanilide, and Permanent Yellow FGL. Colored magnetites, such as mixtures of MAPICO BLACK™, and cyan components may also be selected as pigments with the process of the present invention. The colorants, such as pigments, selected can be flushed pigments as indicated herein.

More specifically, colorant examples include Pigment Blue 15:3 having a Color Index Constitution Number of 74160, Magenta Pigment Red 81:3 having a Color Index Constitution Number of 45160:3, and Yellow 17 having a Color Index Constitution Number of 21105, and known dyes such as food dyes, yellow, blue, green, red, magenta dyes, and the like. Colorants include pigments, dyes, mixtures of pigments, mixtures of dyes, mixtures of dyes and pigments, and the like, and preferably pigments.

Dry powder additives that can be added or blended onto the surface of the toner compositions preferably after washing or drying include, for example, metal salts, metal salts of fatty acids, colloidal silicas, metal oxides like titanium, tin and the like, mixtures thereof and the like, which additives are each usually present in an amount of from about 0.1 to about 2 weight percent, reference U.S. Pat. Nos. 3,590,000; 3,720,617; 3,655,374 and 3,983,045, the disclosures of which are totally incorporated herein by reference. Preferred additives include zinc stearate and flow aids, such as fumed silicas like AEROSIL R972® available from Degussa, or silicas available from Cabot Corporation or Degussa Chemicals, the coated silicas of U.S. Pat. Nos. 6,004,714 and 6,190,815, the disclosures of which are totally incorporated herein by reference, and the like, each in amounts of from about 0.1 to about 2 percent, which can be added during the aggregation process or blended into the formed toner product.

With further respect to the present invention, the $M_z$ characteristics of the resin or polymer latex are of value. The z-average molecular weight $M_z$ the weight-average molecular weight $M_w$, and the number average molecular weight $M_n$ can be determined by gel permeation chromatography (GPC). The gel permeation chromatography yields not only a graph having a curve representing the molecular weight distribution, but also a computation of the average molecular weight by number ($M_n$); the average molecular weight by weight ($M_w$); and z-average molecular weight $M_z$ representing the shape of the tail of the high, for example from about 2 to about 15 number percent molecular weight part of the curve. For molecular weight as weight of polymer per mole, $M_n$, $M_w$, and $M_z$ can be expressed in terms of number of molecules, $N_i$ having molecular weights $M_i$, wherein $M_n$ is number average molecular weight and $M_w$ is weight average molecular weight.

$$M_n = \frac{\Sigma N_i M_i}{\Sigma N_i}$$

$$M_w = \frac{\Sigma N_i M_i^2}{\Sigma N_i M_i}$$

$$M_z = \frac{\Sigma N_i M_i^3}{\Sigma N_i M_i^2}$$

For example, the z-average molecular weight represents the size and the value of the molecular weight in a tailing portion on the side of the high molecular weight, and affects the characteristics of the toner to which the fixing assistant is added. Thus, $M_z$ can be from about 60,000 to about 150,000, and more specifically, from about 75,000 to about 130,000, and yet more specifically, from about 80,000 to about 125,000; $M_w$ is, for example, from about 25,000 to about 45,000, and more specifically, from about 28,000 to about 40,000, and yet more specifically, from about 28,000 to about 37,000; $M_n$ is, for example, from about 6,000 to about 15,000, and more specifically, from about 8,000 to about 13,000, and yet more specifically, from about 9,000 to about 12,000; the ratio of $M_z/M_w$ of the z-average molecular weight to weight average molecular weight, is, for example, from about 2 to about 5, and more specifically, from about 2 to about 4.5, and yet more specifically, from about 2 to about 4; and the ratio of $M_z/M_n$ of the z-average molecular weight to number average molecular weight is, for example, from about 6 to about 13, and more specifically, from about 7 about 12; and yet more specifically, from about 8 to about 10.

Examples of specific calculations utilizing the above equations as expressed in terms of number of molecules Ni with molecular weights Mi follow.

Molecular Weight Calculation

Molecular Weight Calculation

| | Ni | Mi | Ni*Mi | $Ni*Mi^2$ | $Ni*Mi^3$ |
|---|---|---|---|---|---|
| | 100 | 150 | 15000 | 2250000 | 337500000 |
| | 350 | 200 | 70000 | 14000000 | 2800000000 |
| | 450 | 250 | 112500 | 28125000 | 7031250000 |
| | 800 | 450 | 360000 | 162000000 | 72900000000 |
| | 1120 | 900 | 1008000 | 907200000 | 8.1648E+11 |
| | 1580 | 1250 | 1975000 | 2468750000 | 3.08594E+12 |
| | 2010 | 3700 | 7437000 | 27516900000 | 1.01813E+14 |
| | 4000 | 10000 | 40000000 | 4E+11 | 4E+15 |
| | 3450 | 18000 | 62100000 | 1.1178E+12 | 2.01204E+16 |
| | 1570 | 31500 | 49455000 | 1.55783E+12 | 4.90717E+16 |
| | 500 | 75000 | 37500000 | 2.8125E+12 | 2.10938E+17 |
| | 50 | 185000 | 9250000 | 1.71125E+12 | 3.16581E+17 |
| Σ | 15980 | | 209282500 | 7.63048E+12 | 6.00817E+17 |
| $M_n$ | 13097 | | | | |
| $M_w$ | 36460 | | | | |
| $M_z$ | 78739 | | | | |

Thus, for example, from the calculations above, the number average molecular weight $M_n$ is 13,097, the weight average molecular weight $M_w$ is 36,460, and the z-average molecular weight $M_z$ is 78,739.

Developer compositions can be prepared by mixing the toners with known carrier particles, including coated carriers, such as steel, ferrites, and the like, reference U.S. Pat. Nos. 4,937,166 and 4,935,326, the disclosures of which are totally incorporated herein by reference, for example from about 2 percent toner concentration to about 8 percent toner concentration.

Imaging methods are also envisioned with the toners of the present invention, reference for example a number of the patents mentioned herein, and U.S. Pat. No. 4,265,990, the disclosure of which is totally incorporated herein by reference.

With further respect to the present invention in embodiments thereof illustrative examples of resin, polymer or polymers selected for the process of the present invention and present in the latex (i) or added latex include known polymers, such as acrylates, methacrylates, polyesters like poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly (methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly (propyl acrylate-isoprene), and poly(butyl acrylate-isoprene); poly(styrene-propyl acrylate), poly(styrene-butyl acrylate), poly(styrene-butadiene-acrylic acid), poly (styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), poly(styrene-butyl acrylate-acrylononitrile-acrylic acid), poly(styrene-butadiene-β-carboxyethyl acrylate), poly(styrene-butadiene-acrylonitrile-β-carboxyethyl acrylate), poly(styrene-butyl acrylate-βcarboxyethyl acrylate), poly(styrene-butyl acrylate-acrylononitrile-β-carboxyethyl acrylate), and the like. The latex polymer, or resin is generally present in the toner compositions in various suitable amounts, such as from about 65 to about 98 weight percent, or from about 80 to about 96 weight percent of the toner or of the solids, and the latex size suitable for the processes of the present invention can be, for example, from about 0.05 micron to about 0.5 micron in volume average diameter as measured by the Brookhaven nanosize particle analyzer. Other sizes and effective amounts of latex polymer may be selected in embodiments. The total of all toner components, such as resin, calcium stearate, and colorant, is about 100 percent, or about 100 parts.

The polymer selected for the process of the present invention can be prepared by emulsion polymerization methods, and the monomers utilized in such processes include, for example, styrene, acrylates, methacrylates, butadiene, isoprene, acrylic acid, methacrylic acid, itaconic acid, beta carboxy ethyl acrylate, acrylonitrile, and the like. Known chain transfer agents, for example dodecanethiol, from, for example, about 0.1 to about 10 percent, or carbon tetrabromide in effective amounts, such as for example from about 0.1 to about 10 percent, can also be utilized to control the molecular weight properties of the polymer when emulsion polymerization is selected. Other processes of obtaining polymer particles of from, for example, about 0.01 micron to about 2 microns can be selected from polymer microsuspension process, such as disclosed in U.S. Pat. No. 3,674,736, the disclosure of which is totally incorporated herein by reference; polymer solution microsuspension process, such as disclosed in U.S. Pat. No. 5,290,654, the disclosure of which is totally incorporated herein by reference, mechanical grinding processes, or other known processes.

Examples of optional waxes include those as illustrated herein, polypropylenes and polyethylenes commercially available from Allied Chemical and Petrolite Corporation, wax emulsions available from Michaelman Inc. and the Daniels Products Company, EPOLENE N-15™ commercially available from Eastman Chemical Products, Inc., VISCOL 550-P™, a low weight average molecular weight polypropylene available from Sanyo Kasei K. K., and similar materials. The commercially available polyethylenes selected possess, it is believed, a molecular weight $M_w$ of from about 1,000 to about 1,500, while the commercially available polypropylenes utilized for the toner compositions of the present invention are believed to have a molecular weight of from about 4,000 to about 5,000. Examples of functionalized waxes, such as amines, amides, include, for example, AQUA SUPERSLIP 6550™, SUPERSLIP 6530™ available from Micro Powder Inc., fluorinated waxes, for example POLYFLUO 190™, POLYFLUO 200™, POLYFLUO 523XF™, AQUA POLYFLUO 411™, AQUA POLYSILK 19™, POLYSILK 14™ available from Micro Powder Inc., mixed fluorinated, amide waxes, for example MICROSPERSION 19™ also available from Micro Powder Inc., imides, esters, quaternary amines, carboxylic acids or acrylic polymer emulsion, for example JONCRYL 74™, 89™, 130™, 537™, and 538™, all available from SC Johnson Wax, chlorinated polypropylenes and polyethylenes available from Allied Chemical and Petrolite Corporation and S C Johnson wax.

Colorants include pigment, dye, mixtures of pigment and dyes, mixtures of pigments, mixtures of dyes, and the like.

Examples of initiators for the latex preparation include water soluble initiators, such as ammonium and potassium persulfates, in suitable amounts, such as from about 0.1 to about 8 percent, and more specifically, from about 0.2 to about 5 percent (weight percent). Examples of organic soluble initiators include Vazo peroxides, such as VAZO 64™, 2-methyl 2-2'-azpbois propanenitrile, and VAZO 88™, 2-2'-azobis isobutyramide dehydrate in a suitable amount, such as in the range of from about 0.1 to about 8 percent. Examples of chain transfer agents include dodecanethiol, octanethiol, carbon tetrabromide, and the like in various suitable amounts, such as in an amount of from about 0.1 to about 10 percent, and more specifically, from about 0.2 to about 5 percent by weight of monomer.

Surfactants for the preparation of latexes and colorant dispersions can be ionic or nonionic surfactants in effective amounts of, for example, from about 0.01 to about 15, or from about 0.01 to about 5 weight percent of the reaction mixture. Anionic surfactants include sodium dodecylsulfate (SDS), sodium dodecylbenzene sulfonate, sodium dodecylnaphthalene sulfate, dialkyl benzenealkyl, sulfates and sulfonates, abitic acid, available from Aldrich, NEOGEN R™, NEOGEN SC™ obtained from Kao, and the like. Examples of cationic surfactants are dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™ available from Alkaril Chemical Company, SANIZOL™ (benzalkonium chloride), available from Kao Chemicals, and the like, selected in effective amounts of, for example, from about 0.01 percent to about 10 percent by weight. The molar ratio of the cationic surfactant used for flocculation to the anionic surfactant used in the latex preparation is, for example, from about 0.5 to about 4.

Examples of nonionic surfactants selected in various suitable mounts, such as about 0.1 to about 5 weight percent, are polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenac as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™, can be selected.

The following Examples are presented.

Preparation of the Polymer Latexes

LATEX EXAMPLE (I)

A polymer latex (EP106) comprised of a styrene/n-butyl acrylate/β-carboxyethyl acrylate copolymer of 74:23:3 was prepared with 1.7 pph dodecanethiol (chain transfer agent), 0.35 pph branching agent (A-DOD, decanediol diacrylate, available from Shin-Najamura Co., Japan) and 1.5 percent of ammonium persulfate initiator was synthesized by a semicontinuous emulsion polymerization process using the anionic surfactant DOWFAX 2A1™ (sodium tetrapropyl diphenoxide disulfonate, 47 percent active, available from Dow Chemical).

In a 300 gallon jacketed stainless steel reactor with double flight impellers (a four pitched-blade impeller each) set at 35 rpm, 387 kilograms of deionized water with 521 grams of DOWFAX 2A1™ (7 percent of the total surfactant) were charged while the temperature was increased from room temperature, about 23 to about 25° C., to 75° C. A monomer emulsion was prepared by mixing a monomer mixture (310.8 kilograms of styrene, 96.6 kilograms of n-butyl acrylate, 12.2 kilograms of 2-carboxyethyl acrylate (β-CEA), 1.43 kilograms of A-DOD and 4.5 kilograms of 1-dodecanethiol) with 193 kilograms of deionized water and 8.07 kilograms of DOWFAX 2A1™ (93 percent of the total surfactant) at room temperature for 30 minutes in a 150 gallon Pope tank. 6.3 Kilograms of the seed particles generated were pumped from the monomer emulsion into a 20 gallon Pope tank and was later charged into the reactor at 75° C. An initiator solution prepared from 6.1 kilograms of ammonium persulfate in 30.2 kilograms of deionized water was added over 20 minutes after the seed emulsion addition. The reactor was stirred at 48 rpm for an additional 20 minutes to allow seed particle formation at 75° C. The monomer emulsion was fed into the reactor. Monomer emulsion feeding was stopped after 110 minutes, and 2.49 kilograms of 1-dodecanethiol (DDT) were added to the remaining emulsion in the 150 gallon Pope tank, which mixture resulting was mixed for a further 5 minutes before feeding resumed. The remaining monomer emulsion was fed into the reactor over 90 minutes. At the end of the monomer feed, the emulsion was post-heated at 75° C. for 180 minutes, then cooled to 25° C. The reaction system was deoxygenated by passing a stream of nitrogen through it during the reaction. A latex resin containing 42 solids of 42 weight percent styrene-butyl acrylate-β-carboxy ethylacrylate resin, 57 weight percent water, 0.4 weight percent anionic surfactant DOWFAX 2A1™, and 0.6 percent of an ammonium sulfate salt species was obtained. The resulting polymer poly(styrene-butyl acrylate-acrylic acid-β-carboxyethyl acrylate) possessed a z-average molecular weight $M_z$ of 82,000, a weight-average molecular weight $M_w$ of 33,200, and a number-average molecular weight $M_n$ of 10,400, a ratio of $M_z/M_w$ of 2.47, and a ratio of $M_z/M_n$ of 7.88, as determined on a Waters GPC, and a mid-point Tg of 50.7° C., as measured on a Seiko DSC. The latex resin or polymer possessed a volume average diameter of 222 nanometers as measured by light scattering technique on a Coulter N4 Plus Particle Sizer.

LATEX EXAMPLE (II)

A polymer latex (EP107) comprised of styrene/n-butyl acrylate/β-carboxyethyl acrylate copolymer of 74:23:3 with 1.7 pph dodecanethiol (chain transfer agent), 0.35 pph branching agent (A-DOD, decanediol diacrylate) and 1.5 percent of ammonium persulfate initiator was synthesized by a semicontinuous emulsion polymerization process.

In a 300 gallon jacketed stainless steel reactor with double flight impellers (a four pitched-blade impeller each) set at 35 rpm, 387 kilograms of deionized water with 521 grams of DOWFAX 2A1™ (7 percent of the total surfactant) were charged while the temperature was raised from room temperature to 75° C. A monomer emulsion was prepared by mixing a monomer mixture (310.8 kilograms of styrene, 96.6 kilograms of n-butyl acrylate, 12.2 kilograms of 2-carboxyethyl acrylate (β-CEA), 1.43 kilograms of A-DOD and 4.5 kilograms of 1-dodecanethiol) with 193 kilograms of deionized water and 8.07 kilograms of DOWFAX 2A1™ (93 percent of the total surfactant) at room temperature for 30 minutes in a 150 gallon Pope tank. 6.3 Kilograms of seed were pumped from the monomer emulsion into a 20 gallon Pope tank and were later charged into the reactor at 75° C. An initiator solution prepared from 6.1 kilograms of ammonium persulfate in 30.2 kilograms of deionized water was added over 20 minutes after the seed emulsion addition. The reactor was stirred at 48 rpm for an additional 20 minutes to allow seed particle formation at 75° C. The monomer emulsion was then fed into the reactor. Monomer emulsion feeding was stopped after 105 minutes and 2.49 kilograms of 1-dodecanethiol (DDT) were added to the remaining emulsion in the 150 gallon Pope tank which was mixed for a further 5 minutes before feeding resumed. The remaining monomer emulsion was fed into the reactor over 100 minutes. At the end of the monomer feed, the emulsion was post-heated at 75° C. for 180 minutes, then cooled to 25° C. The reaction system mixture was deoxygenated by passing a stream of nitrogen through it during the reaction. A latex resin containing 42 solids of 42 weight percent styrene-butyl acrylate-β-carboxy ethylacrylate resin, 57 weight percent water, 0.4 weight percent anionic surfactant DOWFAX 2A1™, 0.6 percent of an ammonium sulfate salt species was obtained. The resulting polymer poly(styrene-butyl acrylate-acrylic acid-β-carboxyethyl acrylate) possessed a z-average molecular weight $M_z$ of 82,000, a weight average molecular weight $M_w$ of 33,900, and a number average molecular weight $M_n$ of 11,300, a ratio of $M_z$,/$M_w$ of 2.42, and a ratio of $M_z/M_n$ of 7.26, as determined on a Waters GPC, and a mid-point Tg of 51.4° C., as measured on a Seiko DSC. The latex resin or polymer possessed a volume average diameter of 227 nanometers as measured by the known light scattering technique on a Coulter N4 Plus Particle Sizer.

LATEX EXAMPLE (III)

A polymer latex (EP108) comprised of styrene/n-butyl acrylate/β-carboxyethyl acrylate copolymer of 75:22:3 composition with 1.7 pph dodecanethiol (chain transfer agent), 0.35 pph branching agent (A-DOD, decanediol diacrylate) and 1.5 percent of ammonium persulfate initiator was synthesized by a semicontinuous emulsion polymerization process.

In a 300 gallon jacketed stainless steel reactor with double flight impellers (a four pitched-blade impeller each) set at 35 rpm, 387 kilograms of deionized water with 730 grams of DOWFAX 2A1™ (8.5 percent of the total surfactant) were charged while the temperature was raised from room temperature to 75° C. A monomer emulsion was prepared by mixing a monomer mixture (315 kilograms of styrene, 92.4 kilograms of n-butyl acrylate, 12.2 kilograms of 2-carboxyethyl acrylate (β-CEA), 1.43 kilograms of A-DOD and 4.5 kilograms of 1-dodecanethiol) with 193 kilograms of deionized water and 7.86 kilograms of DOWFAX 2A1™ (91.5 percent of the total surfactant) at room temperature for 30 minutes in a 150 gallon Pope tank. 6.3 Kilograms of seed were pumped from the monomer emulsion into a 20 gallon Pope tank and was later charged into the reactor at 75° C. An initiator solution prepared from 6.1 kilograms of ammonium persulfate in 30.2 kilograms of deionized water was added over 20 minutes after the seed emulsion addition. The reactor was stirred at 48 rpm for an additional 20 minutes to allow seed particle formation at 75° C. The monomer emulsion was fed into the reactor. Monomer emulsion feeding was stopped after 110 minutes and 2.49 kilograms of 1-dodecanethiol (DDT) were added to the remaining emulsion in the 150 gallon Pope tank which was mixed for a further 5 minutes before feeding resumed. The remaining monomer emulsion was then fed into the reactor over 90 minutes. At the end of the monomer feed, the emulsion was post-heated at 75° C. for 180 minutes, then cooled to 25° C. The reaction system was deoxygenated by passing a stream of nitrogen through it during the reaction. A latex resin containing 42 solids of 42 weight percent styrene-butyl acrylate-β-carboxy ethylacrylate resin, 57 weight percent water, 0.4 weight percent anionic surfactant DOWFAX 2A1™, and 0.6 percent of an ammonium sulfate salt species was obtained. The resulting polymer poly(styrene-butyl acrylate-acrylic acid-β-carboxyethyl acrylate) possessed a z-average molecular weight $M_z$ of 81,800, a weight average molecular weight $M_w$ of 33,600, and a number average molecular weight $M_n$ of 11,400, a ratio of $M_z/M_w$ of 2.43, and a ratio of $M_z/M_n$ of 7.18, as determined on a Waters GPC, and a mid-point Tg of 51.3° C., as measured on a Seiko DSC. The latex resin or polymer possessed a volume average diameter of 213 nanometers as measured by light scattering technique on a Coulter N4 Plus Particle Sizer.

LATEX EXAMPLE (IV)

A polymer latex (EP110) comprised of styrene/n-butyl acrylate/β-carboxyethyl acrylate copolymer of 74:23:3 composition with 1.7 pph dodecanethiol (chain transfer agent), 0.35 pph branching agent (A-DOD, decanediol diacrylate) and 1.5 percent of ammonium persulfate initiator was synthesized by the following semicontinuous emulsion polymerization process. In a 300 gallon jacketed stainless steel reactor with double flight impellers (a four pitched-blade impeller each) set at 35 rpm, 387 kilograms of deionized water with 521 grams of DOWFAX 2A1™ (7 percent of the total surfactant) were charged while the temperature was raised from room temperature to 75° C. A monomer emulsion was prepared by mixing a monomer mixture (310.8 kilograms of styrene, 96.6 kilograms of n-butyl acrylate, 12.2 kilograms of 2-carboxyethyl acrylate (βCEA), 1.43 kilograms of A-DOD and 4.5 kilograms of 1-dodecanethiol) with 193 kilograms of deionized water and 8.07 kilograms of DOWFAX 2A1™ (93 percent of the total surfactant) at room temperature for 30 minutes in a 150 gallon Pope tank. 6.3 Kilograms of seed were pumped from the monomer emulsion into a 20 gallon Pope tank and was later charged into the reactor at 75° C. An initiator solution prepared from 6.1 kilograms of ammonium persulfate in 30.2 kilograms of deionized water was added over 20 minutes after the seed emulsion addition. The reactor was stirred at 48 rpm for an additional 20 minutes to allow seed particle formation at 75° C. The monomer emulsion was then fed into and added to the reactor. Monomer emulsion feeding was stopped after 90 minutes and 2.49 kilograms of 1-dodecanethiol (DDT) were added to the remaining emulsion in the 150 gallon Pope tank which was mixed for a further 5 minutes before feeding resumed. The remaining monomer emulsion was then fed into the reactor over 90 minutes. At the end of the monomer feed, the emulsion was post-heated at 75° C. for 180 minutes, then cooled to 25° C. The reaction system was deoxygenated by passing a stream of nitrogen through it during the reaction. A latex resin containing 42 solids of 42 weight percent styrene-butyl acrylate-β-carboxy ethylacrylate resin, 57 weight percent water, 0.4 weight percent anionic surfactant DOWFAX 2A1™, and 0.6 percent of an ammonium sulfate salt species was obtained. The resulting polymer poly(styrene-butyl acrylate-acrylic acid-β-carboxyethyl acrylate) possessed a z-average molecular weight $M_z$ of 85,000, a weight average molecular weight $M_w$ of 33,600, and a number average molecular weight $M_n$ of 10,500, a ratio of $M_z/M_w$ of 2.53, and a ratio of $M_z/M_n$ of 8.10, as determined on a Waters GPC, and a mid-point Tg of 51.7° C., as measured on a Seiko DSC. The latex resin or polymer possessed a volume average diameter of 244 nanometers as measured by light scattering technique on a Coulter N4 Plus Particle Sizer.

LATEX EXAMPLE (V)

A polymer latex (EP111) comprised of styrene/n-butyl acrylate/β-carboxyethyl acrylate copolymer of 74:23:3 composition with 1.7 pph dodecanethiol (chain transfer agent), 0.35 pph branching agent (A-DOD, decanediol diacrylate) and 1.5 percent of ammonium persulfate initiator was synthesized by a semicontinuous emulsion polymerization process as follows.

In a 300 gallon jacketed stainless steel reactor with double flight impellers (a four pitched-blade impeller each) set at 35 rpm, 387 kilograms of deionized water with 473 grams of DOWFAX 2A1™ (5.5 percent of the total surfactant) were charged while the temperature was raised from room temperature to 75° C. A monomer emulsion was prepared by mixing a monomer mixture (310.8 kilograms of styrene, 96.6 kilograms of n-butyl acrylate, 12.2 kilograms of 2-carboxyethyl acrylate (β-CEA), 1.43 kilograms of A-DOD and 4.5 kilograms of 1-dodecanethiol) with 193 kilograms of deionized water and 8.11 kilograms of DOWFAX 2A1™ (94.5 percent of the total surfactant) at room temperature for 30 minutes in a 150 gallon Pope tank. 6.3 Kilograms of seed were pumped from the monomer emulsion into a 20 gallon Pope tank and was later charged into the reactor at 75° C. An initiator solution prepared from 6.1 kilograms of ammonium persulfate in 30.2 kilograms of deionized water was added over 20 minutes after the seed emulsion addition. The reactor was stirred at 48 rpm for an additional 20 minutes to allow seed particle formation at 75° C. The monomer emulsion was then fed into the reactor. Monomer emulsion feeding was terminated after 90 minutes and 2.49 kilograms of 1-dodecanethiol (DDT) were added to the remaining emulsion in the 150 gallon Pope tank which was mixed for a further 5 minutes before feeding resumed. The remaining monomer emulsion was then fed into the reactor over 110 minutes. At the end of the monomer feed, the emulsion was post-heated at 75° C. for 180 minutes, then cooled to 25° C. The reaction system was deoxygenated by passing a stream of nitrogen through it during the reaction. A latex resin containing 42 solids of 42 weight percent styrene-butyl acrylate-β-carboxy ethylacrylate resin, 57 weight percent water, 0.4 weight percent anionic surfactant DOWFAX 2A1™, and 0.6 percent of an ammonium sulfate salt species was obtained. The resulting polymer poly(styrene-butyl acrylate-acrylic acid-β-carboxyethyl acrylate) possessed a z-average molecular weight $M_z$ of 94,900, a weight average molecular weight $M_w$ of 35,700, and a number average molecular weight $M_n$ of 11,000, a ratio of $M_z/M_w$ of 2.66, and a ratio of $M_z/M_n$ of 8.63, as determined on a Waters GPC, and a mid-point Tg of 51.0° C., as measured on a Seiko DSC. The latex resin or polymer possessed a volume average diameter of 245 nanometers as measured by light scattering technique on a Coulter N4 Plus Particle Sizer.

Comparative Latex Example 1

A polymer latex (EP112) comprised of styrene/n-butyl acrylate/β-carboxyethyl acrylate copolymer of 74:23:3 composition with 1.7 pph dodecanethiol (chain transfer agent), 0.55 pph branching agent (A-DOD, decanediol diacrylate) and 1.5 percent of ammonium persulfate initiator was synthesized by a semicontinuous emulsion polymerization process as follows.

In a 300 gallon jacketed stainless steel reactor with double flight impellers (a four pitched-blade impeller each) set at 35 rpm, 387 kilograms of deionized water with 521 grams of DOWFAX 2A1™ (7 percent of the total surfactant) were charged while the temperature was raised from room temperature to 75° C. A monomer emulsion was prepared by mixing a monomer mixture (310.8 kilograms of styrene, 96.6 kilograms of n-butyl acrylate, 12.2 kilograms of 2-carboxyethyl acrylate (β-CEA), 2.25 kilograms of A-DOD and 4.5 kilograms of 1-dodecanethiol) with 193 kilograms of deionized water and 8.07 kilograms of DOWFAX 2A1™ (93 percent of the total surfactant) at room temperature for 30 minutes in a 150 gallon Pope tank. 6.3 Kilograms of seed were pumped from the monomer emulsion into a 20 gallon Pope tank and then was later charged into the reactor at 75° C. An initiator solution prepared from 6.1 kilograms of ammonium persulfate in 30.2 kilograms of deionized water was added over 20 minutes after the seed emulsion addition. The reactor was stirred at 48 rpm for an additional 20 minutes to allow seed particle formation at 75° C. The monomer emulsion was then fed into the reactor. Monomer emulsion feeding was stopped after 75 minutes and 2.49 kilograms of 1-dodecanethiol (DDT) were added to the remaining emulsion in the 150 gallon Pope tank which was mixed for a further 5 minutes before feeding resumed. The remaining monomer emulsion was then fed into the reactor over 60 minutes. At the end of the monomer feed, the emulsion was post-heated at 75° C. for 180 minutes, then cooled to 25° C. The reaction system (mixture)was deoxygenated by passing a stream of nitrogen through it during the reaction. A latex resin containing 42 solids of 42 weight percent styrene-butyl acrylate-βcarboxy ethylacrylate resin, 57 weight percent water, 0.4 weight percent anionic surfactant DOWFAX 2A1™, and 0.6 percent of an ammonium sulfate salt species was obtained. The resulting polymer poly(styrene-butyl acrylate-acrylic acid-β-carboxyethyl acrylate) possessed a z-average molecular weight $M_z$ of 231,400, a weight average molecular weight $M_w$ of 43,200, and a number average molecular weight $M_n$ of 11,400, a ratio of $M_z/M_w$of 5.37, and a ratio of $M_z/M_n$ of 20.30, as determined on a Waters GPC, and a mid-point Tg of 50.1° C., as measured on a Seiko DSC. The latex resin or polymer possessed a volume average diameter of 239 nanometers as measured by the known light scattering technique on a Coulter N4 Plus Particle Sizer.

Comparative Latex Example 2

A polymer latex (EP115) comprised of styrene/n-butyl acrylate/β-carboxyethyl acrylate copolymer of 74:23:3 composition with 1.7 pph dodecanethiol (chain transfer agent), 0.25 pph branching agent (A-DOD, decanediol diacrylate) and 1.5 percent of ammonium persulfate initiator was synthesized by a semicontinuous emulsion polymerization process.

In a 300 gallon jacketed stainless steel reactor with double flight impellers (a four pitched-blade impeller each) set at 35 rpm, 387 kilograms of deionized water with 521 grams of DOWFAX 2A1™ (7 percent of the total surfactant) were charged while the temperature was raised from room temperature to 75° C. A monomer emulsion was prepared by mixing a monomer mixture (310.8 kilograms of styrene, 96.6 kilograms of n-butyl acrylate, 12.2 kilograms of 2-carboxyethyl acrylate (β-CEA), 1.02 kilograms of A-DOD and 4.5 kilograms of 1-dodecanethiol) with 193 kilograms of deionized water and 8.07 kilograms of DOWFAX 2A1™ (93 percent of the total surfactant) at room temperature for 30 minutes in a 150 gallon Pope tank. 6.3 Kilograms of seed were pumped from the monomer emulsion into a 20 gallon Pope tank and was later charged into the reactor at 75° C. An initiator solution prepared from 6.1 kilograms of ammonium persulfate in 30.2 kilograms of deionized water was added over 20 minutes after the seed emulsion addition. The reactor was stirred at 48 rpm for an additional 20 minutes to allow seed particle formation at 75° C. The monomer emulsion was then fed into the reactor. Monomer emulsion feeding was stopped after 140 minutes and 2.49 kilograms of 1-dodecanethiol (DDT) were added to the remaining emulsion in the 150 gallon Pope tank which was mixed for a further 5 minutes before feeding resumed. The remaining monomer emulsion was then fed into the reactor over 120 minutes. At the end of the monomer feed, the emulsion was post-heated at 75° C. for 180 minutes, then cooled to 25° C. The reaction system mixture was deoxygenated by passing a stream of nitrogen through it during the reaction. A latex resin containing 42 solids of 42 weight percent styrene-butyl acrylate-carboxy ethylacrylate resin, 57 weight percent water, 0.4 weight percent anionic surfactant DOWFAX 2A1™, 0.6 percent of an ammonium sulfate salt species was obtained. The resulting polymer poly(styrene-butyl acrylate-acrylic acid-β-carboxyethyl acrylate) possessed a z-average molecular weight $M_z$ of 54,900, a weight average molecular weight $M_w$ of 30,700, and a number average molecular weight $M_n$ of 10,300, a ratio of $M_z/M_w$ of 1.79, and a ratio of $M_z/M_n$ of 5.33, as determined on a Waters GPC, and a mid-point Tg of 50.5° C., as measured on a Seiko DSC. The latex resin or polymer possessed a volume average diameter of 186 nanometers as measured by light scattering technique on a Coulter N4 Plus Particle Sizer.

Example I 5.6 Micron Black Toner Particles Generated by PAC A/C Process

The polymer latex of Latex Example (I) (EP106) above was utilized in an aggregation/coalescence process to produce 5.6 micron (volume average diameter) particles with a narrow size distribution.

500 Grams of deionized water was placed in a stainless steel beaker and homogenized at 5,000 rpm, while there was added 300 grams of latex EP106, 37.16 grams of POLYWAX 725® dispersion (31 percent active, available from Baker-Petrolite Company) followed by the addition of 38.3 grams of REGAL 330™ black pigment dispersion (17 percent active, available from Sun Chemicals) diluted with 110 grams of deionized water. To the resulting homogenized latex/pigment blend, 2.4 grams of 10 percent PAC (polyaluminum chloride obtained from Asada Company of Japan) solution diluted with 24 grams of 0.02N $HNO_3$ was added dropwise to cause a flocculation of the black pigment REGAL 330™ carbon black pigment, 6 percent by weight, the POLYWAX 725®, 9 percent by weight, the resin, 84.88 weight percent, and 0.12 weight percent of the PAC. After the addition was complete, homogenization was continued for an additional 2 minutes to form a creamy blend with an average particle size by volume of 2.68 and with a GSD of 1.21. The creamy blend was then transferred into a 2 liter glass reactor and stirred at 350 rpm, while being heated to about 52° C. to about 53° C. Particle growth was monitored during heating. When the particle size diameter by volume was equal to 5.44 (GSD=1.20), the pH of the slurry was adjusted to 7.5 by the addition of a 2 percent NaOH solution and the speed in the reactor was reduced to 200 rpm. After ½ hour of stirring at 53° C., the temperature in the reactor was increased to 95° C. After 1 hour of heating at 95° C., the pH of the slurry was adjusted to 4.3 and the heating was continued for an additional 5 hours. Thereafter, the reactor contents were cooled down to about room temperature, throughout the Examples, about 23° C. to about 25° C. and were discharged. A 16 percent solids slurry of 5.62 micron black toner particles with GSD=1.19 was obtained. The resulting toner product was comprised of about 6 percent of black pigment REGAL 330™, about 9 percent of POLYWAX 725®, about 0.2 weight percent of PAC and about 84.8 percent by weight of the resin poly(styrene-butyl acrylate-2-carboxyethyl acrylate), and wherein the total amount of the toner components was about 100 percent. The toner particles were then washed with deionized water five times.

Example II 5.6 Micron Cyan Toner Particles Generated by a PAC A/C Process

The polymer latex of Latex Example (II) (EP107) above was utilized in an aggregation/coalescence process to produce 5.6 micron particles with a narrow size distribution.

500 grams of deionized water were placed in a stainless steel beaker and homogenized at 5,000 rpm, while 300 grams of the above prepared latex EP107 were added, and 37.16 grams of POLYWAX 725®, dispersion and 5.7 grams of SNOWTEX® colloidal silica dispersion (21 percent active, available from Nissan Chemical) were added followed by the addition of 31.6 grams of the PB15:3 cyan pigment dispersion (17 percent active, available from Sun Chemicals) diluted with 110 grams of deionized water. To the resulting homogenized latex/pigment blend, 2.4 grams of 10 percent PAC solution diluted with 24 grams of 0.02N $HNO_3$ were added dropwise causing flocculation of the cyan pigment, 5 percent by weight, the POLYWAX 725®, 9 percent by weight, the SNOWTEX® colloidal silica, 1 percent by weight, the resin, 84.8 weight percent, and 0.2 weight percent of the PAC. After the addition was complete, homogenization was continued for an additional 2 minutes to form a creamy blend with an average particle diameter size by volume of 2.73, and a GSD of 1.22. The creamy blend was then transferred into a 2 liter glass reactor and stirred at 350 rpm, while being heated to about 52° C. to about 53° C. Particle growth was monitored during heating. When the particle size by volume was equal to 5.61 (GSD=1.21), the pH of the slurry was adjusted to 7.5 by the addition of 2 percent NaOH and the speed in the reactor was reduced to 200 rpm. After ½ hour of stirring at 53° C., the temperature in the reactor was raised to 95° C. After 1 hour of heating at 95°C., the pH of the slurry was adjusted to 4.3 and the heating was continued for an additional 5 hours. Subsequently, the reactor contents were cooled down and discharged. A 16 percent solids slurry of 5.63 micron cyan toner particles with GSD=1.20 was obtained. The resulting toner product was comprised of about 5 percent of cyan pigment PB15:3, about 9 percent of POLYWAX 725®, about 1 percent of SNOWTEX® colloidal silica, about 84.8 percent by weight of poly(styrene-butyl acrylate-2-carboxyethyl acrylate), and about 0.2 percent of PAC and wherein the total amount of the toner components was about 100 percent. The resulting toner particles were washed with deionized water five times.

Example III 5.8 Micron Cyan Toner Particles:PAC A/C Process

The polymer latex of Latex Example (III) (EP108) above was utilized in an aggregation/coalescence process to produce 5.8 micron particles with a narrow size distribution.

500 grams of deionized water was placed in a stainless steel beaker and homogenized at 5,000 rpm, while 300 grams of the above prepared latex EP108 was added; 37.16 grams of POLYWAX 725® dispersion and 5.7 grams of SNOWTEX® colloidal silica dispersion (21 percent active, available from Nissan Chemical) were added followed by the addition of 31.6 grams of the PB15:3 cyan pigment dispersion (17 percent active, available from Sun Chemicals) diluted with 110 grams of deionized water. To the resulting homogenized latex/pigment blend, 2.4 grams of 10 percent PAC solution diluted with 24 grams of 0.02N $HNO_3$ were added dropwise causing a flocculation of the cyan pigment, 5 percent by weight, the POLYWAX 725®, 9 percent by weight, the SNOWTEX® colloidal silica, 1 percent by weight, the resin, 84.8 weight percent, and 0.2 weight percent of the PAC. After the addition was complete, homogenization was continued for an additional 2 minutes to form a creamy blend with an average particle diameter size by volume of 2.83, and a GSD of 1.21. The creamy blend was then transferred into a 2 liter glass reactor and stirred at 350 rpm, while being heated to about 52° C. to about 53° C. Particle growth was monitored during heating. When the particle size by volume was equal to 5.71 (GSD=1.20), the pH of the slurry was adjusted to 7.5 by the addition of 2 percent NaOH and the speed in the reactor was reduced to 200 rpm. After ½ hour of stirring at 53° C., the temperature in the reactor was raised to 95° C. After 1 hour of heating at 95° C., the pH of the slurry was adjusted to 4.3 and the heating was continued for an additional 5 hours. Subsequently, the reactor contents were cooled down and discharged. A 16 percent solids slurry of 5.81 micron cyan toner particles with GSD=1.19 was obtained. The resulting toner that was the above final toner product was comprised of about 5 percent of cyan pigment PB15:3, about 9 percent of POLYWAX 725®, about 1 percent of SNOWTEX® colloidal silica, about 84.8 percent by weight of poly(styrene-butyl acrylate-2-carboxyethyl acrylate), and about 0.2 percent of PAC, and wherein the total amount of the toner components was about 100 percent. The toner particles were washed with deionized water five times.

Example IV 5.6 Micron Magenta Toner Particles:PAC A/C Process

The polymer latex of Latex Example (IV) (EP110) above was utilized in an aggregation/coalescence process to produce 5.6 micron (diameter throughout) particles with a narrow size distribution.

500 grams of deionized water were placed in a stainless steel beaker and homogenized at 5,000 rpm, while 300 grams of latex EP110 were added, while 37.16 grams of POLYWAX 725® dispersion and 5.7 grams of SNOWTEX® colloidal silica dispersion (21 percent active, available from Nissan Chemical) were added followed by the addition of 54 grams of the PR122 magenta pigment dispersion (17 percent active, available from Sun Chemicals) diluted with 110 grams of deionized water. To this homogenized latex/pigment blend, 2.4 grams of 10 percent PAC solution diluted with 24 grams of 0.02N $HNO_3$ were added dropwise to cause a flocculation of the PR122 magenta pigment, 8 percent by weight, the POLYWAX 725®, 9 percent by weight, the SNOWTEX® colloidal silica, 1 percent by weight, the resin, 81.8 weight percent, and 0.2 weight percent of the PAC. After the addition was complete, homogenization was continued for an additional 2 minutes to form a creamy blend with an average particle diameter size by volume of 2.83, and a GSD of 1.24. The creamy blend was then transferred into a 2 liter glass reactor and stirred at 350 rpm, while being heated to about 52° C. to about 53° C. Particle growth was monitored during heating. When the particle size by volume was equal to 5.61 (GSD=1.22), the pH of the slurry was adjusted to 7.5 by the addition of 2 percent NaOH and the speed in the reactor was reduced to 200 rpm. After ½ hour of stirring at 53° C., the temperature in the reactor was increased to 95° C. After 1 hour of heating at 95° C., the pH of the slurry was adjusted to 4.3 and the heating was continued for an additional 5 hours. Thereafter, the reactor contents were cooled down to room temperature, about 22° C. to about 25° C. throughout the Examples, and the contents were discharged. A 16 percent solids slurry of 5.63 micron yellow toner particles with GSD=1.22 was obtained. The resulting toner, that was the above final toner product, was comprised of about 8 percent of magenta pigment PR122, about 9 percent of POLYWAX 725®, about 1 percent of SNOWTEX® colloidal silica, and about 81.8 percent by weight of poly(styrene-butyl acrylate-2-carboxyethyl acrylate), and 0.2 weight percent of PAC, and wherein the total amount of the toner components was about 100 percent. The toner particles were washed with deionized water five times.

Example V 5.6 Micron Yellow Toner Particles:PAC A/C Process

The polymer latex of Latex Example (V) (EP111) above was utilized in an aggregation/coalescence process to produce 5.6 micron particles with a narrow size distribution.

500 Grams of deionized water were placed in a stainless steel beaker and homogenized at 5,000 rpm, while 300 grams latex EP111 were added, while 37.16 grams of POLYWAX 725® dispersion and 5.7 grams of SNOWTEX® colloidal silica dispersion (21 percent active, available from Nissan Chemical) were added followed by the addition of 39 grams of PY74 yellow pigment dispersion (17 percent active, available from Sun Chemicals) diluted with 110 grams of deionized water. To this homogenized latex/pigment blend, 2.4 grams of a 10 percent PAC solution diluted with 24 grams of 0.02N $HNO_3$ were added dropwise to cause a flocculation of the PY74 yellow pigment, 6 percent by weight, the POLYWAX 725®, 9 percent by weight, the SNOWTEX® colloidal silica, 1 percent by weight, the resin, 83.8 weight percent, and 0.2 weight percent of the PAC. After the addition was complete, homogenization was continued for an additional 2 minutes to form a creamy blend with an average particle diameter size by volume of 2.78, and a GSD of 1.20. The creamy blend was then transferred into a 2 liter glass reactor and stirred at 350 rpm, while being heated to about 52° C. to about 53° C. Particle growth was monitored during heating. When the particle size by volume was equal to 5.39 (GSD=1.20), the pH of the slurry was adjusted to 7.5 by the addition of 2 percent NaOH and the speed in the reactor was reduced to 200 rpm. After ½ hour of stirring at 53° C., the temperature in the reactor was raised to 95° C. Subsequent to 1 hour of heating at 95° C., the pH of the slurry was adjusted to 4.3 and the heating was continued for an additional 5 hours. Subsequently, the reactor contents were cooled down to room temperature and the contents are discharged. A 16 percent solids slurry of 5.58 micron yellow toner particles with GSD=1.19 was obtained. The resulting toner, that was the above final toner product, was comprised of about 6 percent of yellow pigment PY74, about 9 percent of POLYWAX 725®, about 1 percent of SNOWTEX® colloidal silica, and about 83.8 percent by weight of the above latex resin poly(styrene-butyl acrylate-2-carboxyethyl acrylate), and 0.2 weight percent of PAC, and wherein the total amount of the toner components was about 100 percent. The toner particles were washed with deionized water five times.

Comparative Example 1

5.6 Micron Black Toner Particles:PAC A/C

The polymer latex of Comparative Latex Example 1 (EP112) above was utilized in an aggregation/coalescence process to produce 5.6 micron toner particles with a narrow size distribution.

500 Grams of deionized water were placed in a stainless steel beaker and homogenized at 5,000 rpm, while 300 grams of latex EP112 were added, while 37.16 grams of POLYWAX 725® dispersion (31 percent active, available from Baker-Petrolite Company) were added followed by the addition of 38.3 grams of the REGAL 330™ black pigment dispersion (17 percent active, available from Sun Chemicals) diluted with 110 grams of deionized water. To the resulting homogenized latex/pigment blend, 2.4 grams of 10 percent PAC solution diluted with 24 grams of 0.02N $HNO_3$ were added dropwise to cause a flocculation of the black pigment REGAL 330™ carbon black pigment, 6 percent by weight, the POLYWAX 725®, 9 percent by weight, the resin, 84.88 weight percent, and 0.12 weight percent of the PAC. After the addition was complete, homogenization was continued for an additional 2 minutes to form a creamy blend with an average particle size by volume of 2.59 and with a GSD of 1.22. The creamy blend was then transferred into a 2 liter glass reactor and stirred at 350 rpm, while being heated to about 52° C. to about 53° C. Particle growth was monitored during heating. When the particle size diameter by volume was equal to 5.47 (GSD=1.21), the pH of the slurry was adjusted to 7.5 by the addition of 2 percent NaOH and the speed in the reactor was reduced to 200 rpm. After ½ hour of stirring at 53° C., the temperature in the reactor was raised to 95° C. After 1 hour of heating at 95° C., the pH of the slurry was adjusted to 4.2 and the heating was continued for an additional 5 hours. Thereafter, the reactor content was cooled down to about room temperature throughout the Examples, about 23° C. to about 25° C. and was discharged. A 16 percent solids slurry of 5.64 micron black toner particles with GSD=1.20 was obtained. The resulting toner, that was the above final toner product, was comprised of about 6 percent of black pigment REGAL 330™, about 9 percent of POLYWAX 725®, about 0.2 weight percent of PAC, and about 84.8 percent by weight of the resin poly(styrene-butyl acrylate-2-carboxyethyl acrylate), and wherein the total amount of the toner components was about 100 percent. The toner particles were then washed with deionized water five times.

Comparative Example 2

5.6 Micron Cyan Toner Particles by PAC A/C Process

The polymer latex of Comparative Latex Example 2 (EP115) above was utilized in an aggregation/coalescence process to produce 5.6 micron particles with a narrow size distribution.

500 Grams of deionized water were placed in a stainless steel beaker and homogenized at 5,000 rpm, while 300 grams of the above prepared latex EP115 were added, while 37.16 grams of POLYWAX 725® dispersion and 5.7 grams of SNOWTEX® colloidal silica dispersion (21 percent active, available from Nissan Chemical) were added followed by the addition of 31.6 grams of the PB15:3 cyan pigment dispersion (17 percent active, available from Sun Chemicals) diluted with 110 grams of deionized water. To the resulting homogenized latex/pigment blend, 2.4 grams of 10 percent PAC solution diluted with 24 grams of 0.02N $HNO_3$ were added dropwise to cause a flocculation of the cyan pigment, 5 percent by weight, the POLYWAX 725®, 9 percent by weight, the SNOWTEX® colloidal silica, 1 percent by weight, the resin, 84.8 weight percent, and 0.2 weight percent of the PAC. After the addition was complete, homogenization was continued for an additional 2 minutes to form a creamy blend with an average particle diameter size by volume of 2.76, and a GSD of 1.23. The creamy blend was then transferred into a 2 liter glass reactor and stirred at 350 rpm, while being heated to about 52° C. to about 53° C. Particle growth was monitored during heating. When the particle size by volume was equal to 5.60 (GSD=1.22), the pH of the slurry was adjusted to 7.5 by the addition of 2 percent NaOH and the speed in the reactor was reduced to 200 rpm. After ½ hour of stirring at 53° C., the temperature in the reactor was raised to 95° C. After 1 hour of heating at 95° C., the pH of the slurry was adjusted to 4.3 and the heating was continued for an additional 5 hours. Subsequently, the reactor contents were cooled down and discharged. A 16 percent solids slurry of 5.64 micron cyan toner particles with GSD=1.21 was obtained. The resulting toner, that was the above final toner product, was comprised of about 5 percent of cyan pigment PB15:3, about 9 percent of POLYWAX 725®, about 1 percent of SNOWTEX® colloidal silica, about 84.8 percent by weight of poly(styrene-butyl acrylate-2-carboxyethyl acrylate), and about 0.2 percent of PAC, and wherein the total amount of the toner components was about 100 percent. The toner particles were then washed with deionized water five times.

Toner Fusing and stripping Evaluations

Standard fusing properties of the above prepared toner compositions were evaluated throughout as follows: unfused images of toner on paper with a controlled toner mass per unit area of 0.43 milligram/$cm^2$ were produced by one of a number of methods. A suitable electrophotographic developer was generated by mixing from 2 to 10 percent by weight of the toner with a suitable electrophotographic carrier, such as, for example, a 65 micron Hoeganaes steel core, spray coated with 0.5 weight percent of a terpolymer of poly(methyl methacrylate), styrene, and vinyltriethoxysilane, and roll milling the mixture for 10 to 30 minutes to achieve a triboelectrical charge of between −5 to −20 microcoulombs per gram of toner as measured by the known Faraday Cage process. The developer was introduced into a small electrophotographic copier, such as the Xerox Corporation 2240, in which the fuser system had been disconnected. Between 20 to 50 unfused images of a test pattern of a 65 millimeter by 65 millimeter square solid area were produced on 8.5 by 11 inch sheets of a typical electrophotographic paper such as Xerox Corporation Image LX paper.

The unfused images were then fused by feeding them through a hot roll fuser consisting of a fuser roll and pressure roll with elastomer surfaces, both of which were heated to a controlled temperature. Fused images were produced over a range of hot roll fusing temperatures from about 130° C. to about 21° C. The gloss of the fused images was measured according to TAPPI Standard T480 at a 75° angle of incidence and reflection using a Novo-Gloss Statistical Gloss Meter, Model GL-NG 1002S from Paul N. Gardner Company, Inc. The degree of permanence of the fused images was evaluated by the Crease Test (crease test data can be expressed as MFT). The fused images were folded under a specific weight with the toner image to the inside of the fold. The image was then unfolded and any loose toner wiped from the resulting crease with a cotton swab. The average width of the paper substrate, which shows through the fused toner image in the vicinity of the crease, was measured with a custom built image analysis system.

The degree of permanence of the fused images was also characterized by the hot offset temperature (data can be expressed as HOT). When the heating is excessive, the viscosity of the toner was low (the complex viscosity of the toner was lower than about $5\times10^2$ Pas, as measured by a sinusoidal wave oscillation method at a frequency of 6 rad/second and at the test temperature of from about 100° C. to about 250° C.). At about 11 weight percent of the fused toner the fixing layer can adhere on the side of the fuser roll to cause undesirable hot offset. Typically, a resin having a large molecular weight (of about higher than 35,000) can be used to prevent the hot offset due to excessive melting.

The fusing performance of a toner was traditionally judged from the fusing temperatures required to achieve acceptable image gloss and fix. For high quality black applications, an image gloss greater than 25 gloss units was preferred. For high quality color applications, an image gloss greater than 35 gloss units was preferred. Similarly, the minimum fuser temperature required to produce a crease value less than the maximum acceptable crease was known as the Minimum Fix Temperature (MFT) for a given toner. In general, it was desirable to have an MFT as low as possible, such as for example MFT was below 170° C., and preferably below 160° C. in order to minimize the power requirements of the hot roll fuser. It may also be desirable to arrive at a hot offset temperature (HOT) higher than, for example, about 200° C., and preferably higher than about 210° C., such as 220° C. to ensure that toner does not adhere to a fixing fixture and to minimize/prevent hot offset.

The stripping (peelability) performance of a toner after fusing can be evaluated by the stripping force required to achieve acceptable stripping of fused toner substrate from fuser roll. In oilless fixing (typically in xerographic fusing, silicon or mecaptan oils are used to assist toner substrate release from fuser roll. The term "oilless" refers, for example, to the use of no oil to assist substrate release), the stripping of the toner from the fixing roll generally depends on the stringiness of the molten toner. Stringiness was one of the properties characteristic of a toner resin molecular structure, such as the properties of resin molecular weight and polymer chain entanglement. As stringiness increases, stripping during oilless fixing worsens or decreases, that is for example the required stripping force required will increase, and thus the stripping force required for stripping was increased. Stripping force was measured by using a remodeled version of a Color 645 Stripping Force Fixture (produced by Fuji Xerox) of fused toner on Fuji Xerox S paper with a controlled toner mass per unit area of 1.35 milligram/$cm^2$ with the fixing rate being predetermined to 200 mm/second, the carried amount of toner being predetermined to 4.5 gram/$m^2$, 9 grams/$m^2$ and 13.5 grams/$m^2$, and the fixing temperature being predetermined to 160° C., 180° C., and 200° C. The toner was peeled without any resistance regardless of the carried amount of the toner. In general, it was desirable to have a low stripping force, such as for example, a stripping force equal to or below 25 gf, and more specifically, below 20 gf in order to achieve a fixed image with a high surface gloss and with no high temperature offset.

The fusing and stripping evaluation of the toners in Examples I to V, and Comparative Examples 1 to 2 is summarized in Table 1. As shown in the Table, it was found that a toner polymer resin with controlled z-average molecular weight $M_z$ of the polymer latex of about 60,000 to about 150,000, a ratio $M_z/M_w$ of the z-average molecular weight $M_z$ to a weight average molecular weight $M_w$ of about 2 to about 5, a ratio $M_z/M_n$ of the z-average molecular weight $M_z$ to the number average molecular weight $M_n$ of about 6 to about 13, determined by gel permeation chromatography (GPC), the temperature dependence of stripping during oilless fixing can be suppressed, making it possible to provide a toner with excellent surface gloss for the fixed images, OHP transparency (transparency for overhead projector, such as Xerox 3R6218) and bending resistance of fixed image. Also, the toner stripping (peelability) and fixing property at a high temperature, that is HOT, and the surface gloss can be ensured. In Comparative Example 1, when $M_z$ exceeded 150,000, a ratio of $M_z/M_w$ exceeded 5, or a ratio of $M_z/M_n$ exceeded 13, the toner gloss and fixing properties at a low temperature was deteriorated. In Comparative Example 1, the toner's gloss was less than 25 ggu, and MFT was higher than 168° C. In Comparative Example 2, when $M_z$, was less than 60,000, a ratio of $M_z/M_w$ was less than 2, or a ratio of $M_z/M_n$ was less than 6, generation of hot offset at a high temperature side and increase in stripping force associated thereto were liable to occur. This was shown in Comparative Example 2, the toner's stripping force was higher than 25 gf, and HOT was below 200° C. (This toner, when fused, needed higher stripping force to be peeled off from a fuser roll. Also, this toner had a hot offset temperature (HOT) of 185° C., thus the fused toner tended to adhere to the fixing fixture at lower temperature. It was desirable to have a toner HOT higher than about 200° C., and preferably higher than 210° C. to, for example, prevent hot offset.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A process comprising heating a latex and a colorant, and optionally a wax, and wherein the latex contains a polymer with a $M_z$ value of from about 60,000 to about 150,000.

2. A process in accordance with claim 1 wherein said latex is an emulsion comprised of said resin, water, and an ionic

TABLE 1

Fusing and Stripping Evaluation of Toner Particles

| Example | I | II | III | IV | V | Comparative 1 | Comparative 2 |
|---|---|---|---|---|---|---|---|
| Latex $M_z$ | 82,000 | 82,000 | 81,800 | 85,000 | 94,900 | 231,400 | 54,900 |
| Latex $M_w$ | 33,200 | 33,900 | 33,600 | 33,600 | 35,700 | 43,200 | 30,700 |
| Lates $M_n$ | 10,400 | 11,300 | 11,400 | 10,500 | 11,000 | 11,400 | 10,300 |
| Latex $M_z/M_w$ | 2.47 | 2.42 | 2.43 | 2.53 | 2.66 | 5.37 | 1.79 |
| Latex $M_z/M_n$ | 7.88 | 7.26 | 7.18 | 8.10 | 8.63 | 20.30 | 5.33 |
| MFT (° C.) | 152 | 128 | 130 | 135 | 120 | 168 | 145 |
| HOT (° C.) | 210 | 210 | 210 | 220 | 220 | 220 | 185 |
| Stripping Force (gf) | 9.1 | 10.3 | 8.8 | 9.4 | 10.5 | 7.5 | 31.4 |
| Gloss (ggu) | 35 | 37 | 35 | 45 | 42 | 23 | 36 |

surfactant, and wherein said colorant is a dispersion containing a colorant, water, and an ionic surfactant, and wherein said wax is a dispersion containing a colorant, water, and an ionic surfactant.

3. A process in accordance with claim 1 wherein said heating involves a first heating below the glass transition temperature of said polymer, and a second heating above the glass transition temperature of said polymer or resin.

4. A process in accordance with claim 3 wherein said $M_z$ is from about 65,000 to about 135,000.

5. A process in accordance with claim 3 wherein said $M_z$ is from about 75,000 to about 130,000.

6. A process in accordance with claim 3 wherein said $M_z$ is from about 80,000 to about 125,000.

7. A process in accordance with claim 3 wherein the weight average molecular weight of said polymer is from about 25,000 to about 40,000 and the number average molecular weight of said polymer is from about 6,000 to about 15,000, and wherein the $M_z/M_w$ is from about 2 to about 5 and the $M_z/M_n$ is from about 6 to about 13.

8. A process in accordance with claim 3 wherein the weight average molecular weight of said polymer is from about 28,000 to about 40,000 and the number average molecular weight of said polymer is from about 8,000 to about 13,000, and wherein the $M_z/M_w$ is from about 2 to about 4.5, and the $M_z/M_n$ is from about 7 to about 12.

9. A process in accordance with claim 3 wherein the weight average molecular weight of said polymer is from about 28,000 to about 37,000, and the number average molecular weight of said polymer is from about 9,000 to about 12,000, and wherein the $M_z/M_w$ is from about 2 to about 4 and the $M_z/M_n$ is from about 8 to about 10.

10. A process in accordance with claim 3 wherein the weight average molecular weight of said polymer is from about 28,000 to about 37,000 and the number average molecular weight of said polymer is from about 9,000 to about 12,000, and wherein the $M_z/M_w$ is from about 2 to about 4 and the $M_z/M_n$ is from about 8 to about 10.

11. A process in accordance with claim 3 wherein said second heating is from about 70° C. to about 99° C.

12. A process in accordance with claim 3 wherein said first heating is from about 35° C. to about 45° C., and said second heating is from about 70° C. to about 96° C.

13. A process in accordance with claim 3 wherein said first heating is from about 35° C. to about 45° C., and said second heating is from about 75° C. to about 95° C.

14. A process in accordance with claim 3 wherein said first heating causes aggregation of said resin, said colorant and said wax, and said second heating uses coalescence of said resin, said colorant and said wax.

15. A process in accordance with claim 3 wherein said temperature below about said polymer is from about 40° C. above about said resin $T_g$, and which heating is from about 65° C. to about 75° C.

16. A process in accordance with claim 15 wherein the temperature at which the aggregation is accomplished controls the size of the aggregates, and wherein the product is a toner, and is from about 2 to about 15 microns in volume average diameter.

17. A process in accordance with claim 3 wherein said resin is a styrene/butylacrylate/β-carboxy acrylate.

18. A process in accordance with claim 3 wherein said first heating is from about 35° C. to about 50° C.

19. A process in accordance with claim 3 wherein said first heating is from about 35° C. to about 48° C.

20. A process in accordance with claim 1 wherein said polymer is present in an amount of from about 65 to about 96 percent by weight of said product, and which product is a toner; the colorant is present in an amount of from about 2 to about 15 weight percent of the toner, and the wax is present in an amount of from about 2 to about 20 weight percent of the toner, and wherein the total thereof is about 100 percent.

21. A process in accordance with claim 1 wherein there is added to the mixture a second latex, and which latex is comprised of submicron resin particles suspended in an aqueous phase containing an ionic surfactant, and wherein said second latex is optionally selected in an amount of about 10 to about 40 percent by weight of the initial latex.

22. A process in accordance with claim 1 wherein the colorant is a pigment.

23. A process in accordance with claim 1 wherein said polymer is selected from the group consisting of poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), and poly(butyl acrylate-isoprene); poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), poly(styrene-butyl acrylate-acrylononitrile-acrylic acid), poly(styrene-butadiene-β-carboxyethyl acrylate), poly(styrene-butadiene-acrylonitrile-β-carboxyethyl acrylate), poly(styrene-butyl acrylate-β-carboxyethyl acrylate), and poly(styrene-butyl acrylate-acrylononitrile-β-carboxyethyl acrylate).

24. A process in accordance with claim 1 wherein said polymer is a poly(styrene-butyl acrylate-acrylic acid), poly(styrene-butyl acrylate-β-carboxyethyl acrylate), or poly(styrene-butadiene-acrylic acid).

25. A process in accordance with claim 1 wherein the colorant is carbon black, cyan, yellow, magenta, or mixtures thereof, and the product isolated is a toner of from about 2 to about 25 microns in volume average diameter, and the particle size distribution thereof is optionally from about 1.15 to about 1.30; and wherein there is added to the surface of the formed toner metal salts, metal salts of fatty acids, silicas, metal oxides, or mixtures thereof, each in an amount of from about 0.1 to about 10 weight percent of the obtained toner.

26. A process in accordance with claim 1 wherein said resin is a styrene/butylacrylate/β-carboxy acrylate.

27. A process in accordance with claim 1 wherein said polymer is a polyester of poly(1,2-propylene-sodio 5-sulfoisophthalate), poly(neopentylene-sodio 5-sulfoisophthalate), poly(diethylene-sodio 5-sulfoisophthalate), copoly-(1,2-propylene-sodio 5-sulfoisophthalate)-copoly(1,2-propylene-terephthalatephthalate), copoly-(1,2-propylene-diethylenesodio 5-sulfoisophthalate)-copoly-(1,2-propylene-diethylene-terephthalatephthalate), copoly-(ethylene-neopentylene-sodio 5-sulfoisophthalate)-copoly-(ethylene-neopentylene-terephthalate-phthalate), or copoly-(propoxylated bisphenol A)-copoly-(propoxylated bisphenol A-sodio 5-sulfoisophthalate).

28. A toner process comprising mixing a latex with a colorant; heating the resulting mixture below the glass transition temperature (Tg) of the polymer present in the latex; heating above the Tg of the polymer; and wherein the polymer possesses a $M_z$ value of from about 70,000 to about 150,000.

29. A process in accordance with claim 28 wherein said $M_z$ is calculated as follows $$M_z = \frac{\Sigma N_i M_i^3}{\Sigma N_i M_i^2}$$

wherein each $N_i$ represents the number of molecules, and each $M_i$ represents the molecular weight.

30. A process in accordance with claim 29 wherein said $M_w$ is from about 25,000 to about 40,000; said $M_n$ is from about 6,000 to about 15,000; said $M_z/M_w$ ratio is from about 2 to about 5; and said $M_z/M_n$ ratio is from about 6 to about 13.

31. A process in accordance with claim 29 wherein said $M_w$ is from about 28,000 to about 37,000; said $M_n$ is from about 9,000 to about 12,000; said $M_z/M_w$ ratio is from about 2 to about 4; and said $M_z/M_n$ ratio is from about 8 to about 10.

32. A process in accordance with claim 28 wherein said $M_z$ is from about 65,000 to about 135,000.

33. A process in accordance with claim 28 wherein said $M_z$ is from about 75,000 to about 130,000.

34. A process in accordance with claim 28 wherein said $M_z$ is from about 80,000 to about 125,000.

35. A process comprising heating a latex and a colorant, and wherein the latex contains a polymer with a $M_z$ value of from about 60,000 to about 150,000.

* * * * *